United States Patent [19]

Winter et al.

[11] Patent Number: 4,878,733

[45] Date of Patent: Nov. 7, 1989

[54] OPTICAL FIBER COMMUNICATION CABLE HAVING A HIGH STRENGTH, DRAWN COPPER ALLOY TUBE

[75] Inventors: Joseph Winter, New Haven; Michael J. Pryor, Woodbridge, both of Conn.

[73] Assignee: Olin Corporation, New Haven, Conn.

[21] Appl. No.: 497,546

[22] Filed: May 24, 1983

[51] Int. Cl.$^4$ .............................................. G02B 6/44
[52] U.S. Cl. ................................................. 350/96.23
[58] Field of Search .................... 350/96.23; 219/60 R, 219/61

[56] References Cited

U.S. PATENT DOCUMENTS

| | | | |
|---|---|---|---|
| 3,226,522 | 12/1965 | Duddridge et al. | 219/60 |
| 3,544,752 | 12/1970 | Lehnert et al. | 219/60 |
| 3,733,225 | 5/1973 | Moody | 156/43 |
| 4,156,104 | 5/1979 | Mondello | 350/96.23 |
| 4,212,097 | 7/1980 | Portinari et al. | 350/96.23 |
| 4,232,935 | 11/1980 | Rohner et al. | 350/96.23 |
| 4,239,336 | 12/1980 | Parfree et al. | 350/96.23 |
| 4,257,675 | 3/1981 | Nakagome et al. | 350/96.23 |
| 4,275,294 | 6/1981 | Davidson | 350/96.23 |
| 4,278,835 | 7/1981 | Jackson | 350/96.23 |
| 4,279,470 | 7/1981 | Portinari et al. | 350/96.23 |
| 4,324,453 | 4/1982 | Patel | 350/96.23 |
| 4,341,440 | 7/1982 | Trezeguet et al. | 350/96.23 |
| 4,349,243 | 9/1982 | Amano et al. | 350/96.23 |
| 4,367,917 | 1/1983 | Gray | 350/96.23 |
| 4,372,792 | 2/1983 | Dey et al. | 350/96.23 |
| 4,432,605 | 2/1984 | Niiro et al. | 350/96.23 |
| 4,437,729 | 3/1984 | Parfree et al. | 350/96.23 |
| 4,460,419 | 7/1984 | Parfree et al. | 156/56 |

FOREIGN PATENT DOCUMENTS

| | | | |
|---|---|---|---|
| 23154 | 1/1981 | European Pat. Off. | 350/96.23 |
| 2507648 | 9/1976 | Fed. Rep. of Germany | 350/96.23 |
| 2507649 | 9/1976 | Fed. Rep. of Germany | . |
| 4217 | 8/1905 | France | . |
| 2468136 | 5/1981 | France | 350/96.23 |
| 64706 | 4/1982 | Japan | 350/96.23 |
| 2018454 | 10/1979 | United Kingdom | 350/96.23 |
| 1583520 | 1/1981 | United Kingdom | 350/96.23 |
| 1592191 | 7/1981 | United Kingdom | 350/96.23 |
| 2091903A | 8/1982 | United Kingdom | . |

OTHER PUBLICATIONS

"Guidelines to the Design of Optical Cables" by Wilkins, presented at the Winter Annual Meeting, Dec. 2-7, 1979 of the American Society of Mechanical Engineers.
"An Electro-Optical Array Support Cable" by Wilkins, presented at the Winter Annual Meeting, Nov. 16-21, 1980 of the American Society of Mechanical Engineers.
"Recent Experience with Small, Undersea Optical Cables", by Wilkings, IEEE-EASCON, Oct., 1979, Washington, D.C.
*Manufacturing Processes*, Sixth Edition, by Myron L. Begeman et al., John Wiley and Sons, Inc., 1957, pp. 283-285.
*Manufacturing Processes*, Sixth Edition, by Begeman et al., John Wiley and Sons, Inc., 1957, pp. 281-283.
Bark et al., Proceedings of the 27th International Wire and Cable Symposium, Cherry Hill, N.J., U.S.A., Nov. 14-16, 1978, "Fiber Optic Cable Design, Testing and Installation Experiences", pp. 379-384.

*Primary Examiner*—Frank Gonzalez
*Attorney, Agent, or Firm*—H. Samuel Kieser

[57] ABSTRACT

An optical fiber communication cable comprises providing at least one optical fiber and surrounding the optical fiber with a high strength drawn copper alloy tube having a generally longitudinally extending seam. The edges of the tube which define the seam are substantially nonlinear deformed edges whose length from the outside of the tube to the inside thereof exceeds the thickness of the tube wall.

13 Claims, 3 Drawing Sheets

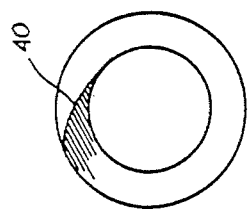
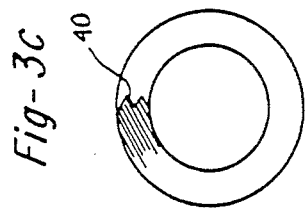
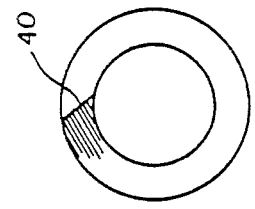
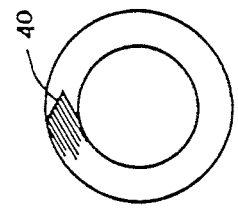
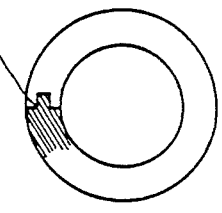
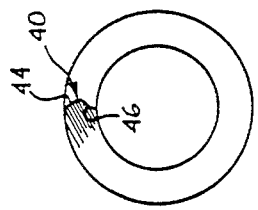
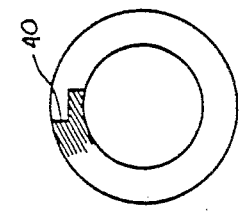
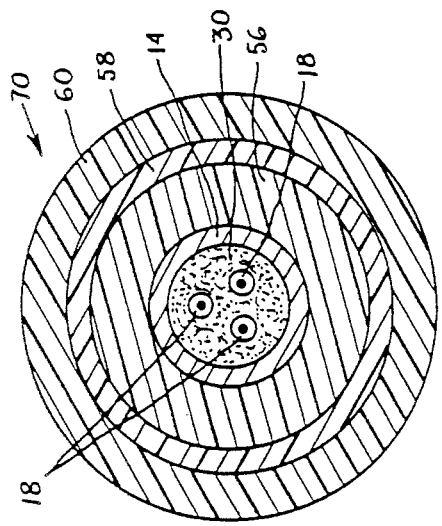
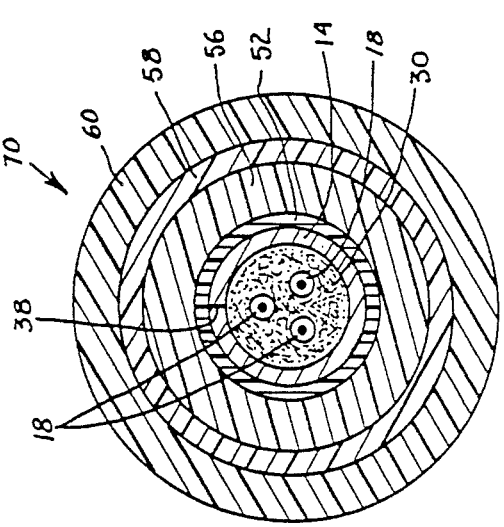

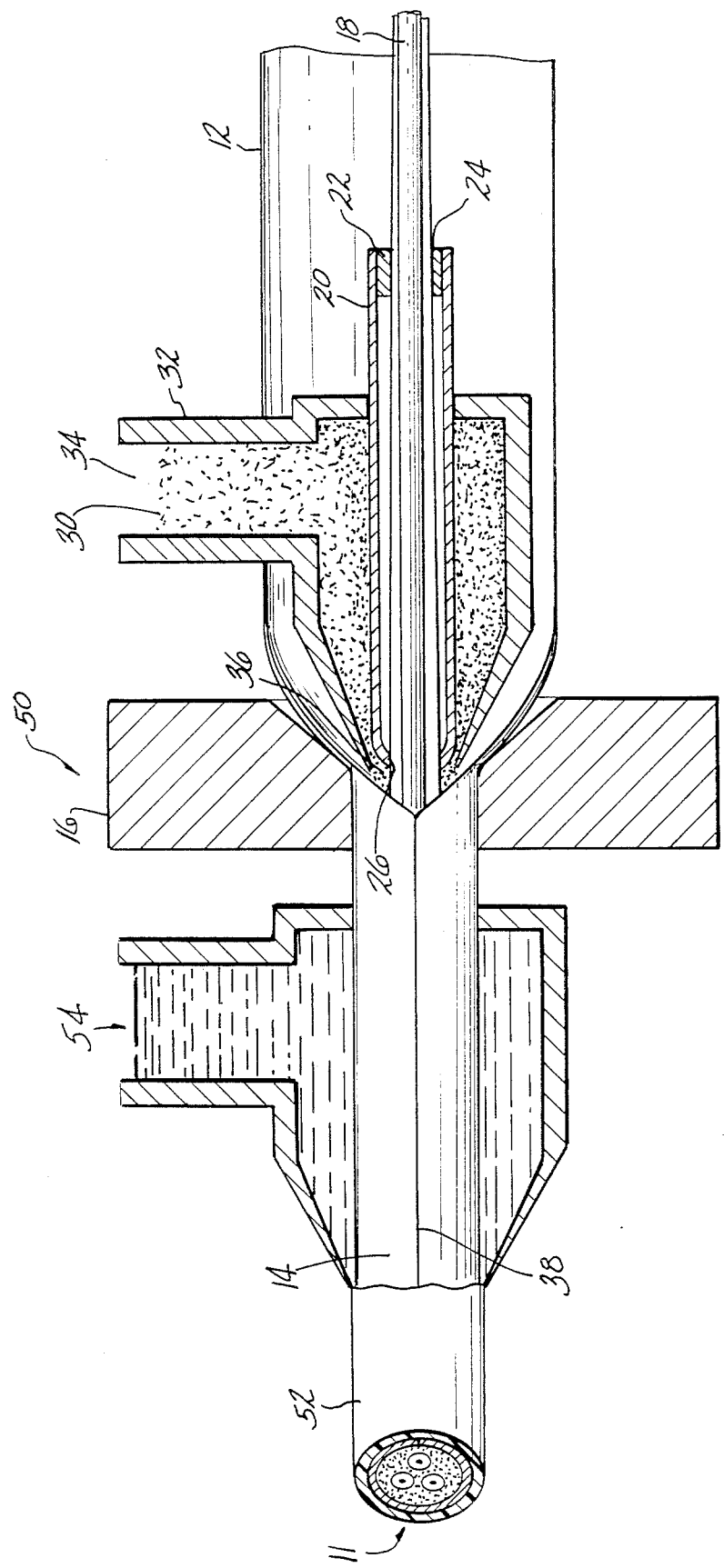

OPTICAL FIBER COMMUNICATION CABLE HAVING A HIGH STRENGTH, DRAWN COPPER ALLOY TUBE

CROSS REFERENCE TO RELATED APPLICATIONS

This application is a continuation-in-part of U.S. application Ser. No. 272,154, filed Jun. 10, 1981, now abandoned.

This application is also related to U.S. Ser. No. 408,087, filed Aug. 13, 1982, for "Method and Apparatus for Assembling an Optical Fiber Communication Cable", now abandoned and refiled as U.S. Ser. No. 497,533, filed May 24, 1983, now U.S. Pat. No. 4,577,925, U.S. Ser. No. 413,846, filed Sept. 1, 1982, now U.S. Pat. No. 4,508,423, which is a Continuation-in-Part of U.S. Ser. No. 324,242, filed Nov. 23, 1981, now abandoned, for "Method and Apparatus for Assembling an Optical Fiber Communication Cable"; U.S. Ser. No. 395,443, filed Jul. 6, 1982, now U.S. Pat. No. 4,479,702, for "Method and Apparatus for Assembling a Compact Multi-Conductor Optical Fiber Communication Cable"; U.S. Ser. No. 430,069, filed Sept. 30, 1982, now U.S. Pat. No. 4,557,559, for "Process for Die Forming a Tubular Member at a Reduced Drawing Force"; and U.S. Ser. No. 461,736, filed Jan. 28, 1983, for "Process and Apparatus for Fabricating Tubular Structures", now abandoned and refiled as U.S. Ser. No. 497,522, filed May 24, 1983, now abandoned.

The invention disclosed herein relates to a method and apparatus for assembling an optical fiber communication cable and the communication cable produced by this method and apparatus. The cable of the instant invention has utility in both underground and undersea applications.

The advent of optical fibers for use in communication applications has permitted construction of relatively small diameter cables. However, the fabrication of these cables has been hampered by the characteristics which these cables must exhibit.

An optical fiber communication cable must be designed to provide all required electrical, optical, and physical functions within the smallest possible diameter. Then, the cable must be constructed so that it has a relatively long uninterrupted length and good flexibility characteristics. Furthermore, in undersea applications, the cable must be able to withstand such stresses as hydrostatic pressure, temperature, and sea action.

An optical fiber communication cable generally consists of several layers of appropriate polyethylene, KEVLAR, or other similar materials encapsulating a strengthening means, such as a braided cable, within which a dielectric layer is used to protect an inner conducting tube. The inner conducting tube is known as the core of the cable. The core contains within it an appropriate polyethylene or other long chain plastic gel which helps to position one or more glass optical fibers. Typical optical cable constructions are those shown and discussed in Parfree U.S. Pat. No. 4,239,336 et al., in "Guidelines to the Design of Optical Cables" by Wilkins, presented at the Winter Annual Meeting, Dec. 2–7, 1979 of the American Society of Mechanical Engineers, in "An Electro-Optical Array Support Cable" by Wilkins, presented at the Winter Annual Meeting, Nov. 16–21, 1980 of the American Society of Mechanical Engineers, and in "Recent Experience With Small, Undersea, Optical Cables" by Wilkins, IEEE-EASCON, Oct. 1979, Washington, D.C.

Various approaches for assembling these optical cables are known in the art. One approach places optical fibers within a split aluminum tube. A copper tube is made from copper tape and is formed over the aluminum tube so as to provide a hermetic seal. The copper tube may then be surrounded by a dielectric layer, a strength member layer, and a sheath. An alternative to this approach surrounds the aluminum tube by a strength member layer which is then surrounded by a copper tape layer, a dielectric layer and a sheath. Parfree U.S. Pat. No, 4,239,336 et al. is illustrative of these approaches.

In a second approach, a copper tube is manufactured by extrusion. A side of the tube is slit open as it emerges from the extrusion die. The opening is enlarged and one or more buffered optical fibers is inserted along with a void filling gel. The tube is then squeezed shut and the slit permanently closed by welding. The tube is finally surrounded by a dielectric layer, a loadbearing section and an outer jacket. Illustrative of this approach is "An Electro-Optical Array Support Cable" by Wilkins.

Yet another approach known in the art rolls an electrical conductor tube from a flat-tape stock of tempered copper alloy. Just before tube closure, the optical fibers are inserted and void filler flowed into the tube channel. Then, the tube is forced shut and permanently welded or soldered. A dielectric insulator is then extruded thereon. After extrusion, a load bearing annulus and a jacket are formed around the dielectric insulator. A copper alloy which may be used to form this tube is a copper/zirconium alloy, CDA 151, made by Olin Corporation.

The fabrication of these optical communication cables has been hampered by an inability to get extremely long uninterrupted lengths of assembled cable. Furthermore, the tube has to be threaded with one or more glass conductor rods or fibers whose diameter is approximately ½ mm. Frequently, kinking or breaking of the fiber occurs during threading, resulting in non-usable cable. If the fiber threading operation is successful, there still remains the problem of filling the tube with the appropriate gel while maintaining the fibers in reasonable separation.

In accordance with the instant invention, a method and apparatus for assembling an optical fiber communication cable and the cable produced by this method and apparatus are disclosed. The assembly of the cable core comprises pulling a strip of metal or metal alloy through a die to form a tubular conductor and simultaneously inserting at least one optical fiber into the forming conductor. Furthermore, a cushioning material is simultaneously inserted into the forming tubular conductor. The cushioning material substantially surrounds the at least one optical fiber. The edges of the strip may be shaped so that as the tubular conductor is formed, a mechanical interlock joint is also formed. The seam of the tube may be welded or soldered to provide a desired degree of hermeticity. In lieu of welding or soldering, a tube edge locking sheath may be co-extruded around the tubular conductor to maintain the tube in a closed configuration. After the cable core is formed, the cable is completed by surrounding the core with a dielectric layer, a loadbearing layer, and an outer covering.

The cable produced by this method and apparatus can have a relatively small diameter while also exhibiting good flexibility characteristics. The cable is capable of resisting sea action and of withstanding the pressures and temperatures associated with undersea applications. In addition, the cable can be level wound on a storage reel and can be stored on a reel with a minimum total volume. Furthermore, the cable produced by the instant invention may have relatively long uninterrupted lengths.

It is an object of the present invention to provide a method and apparatus for assembling an optical fiber communication cable having a relatively small diameter.

It is a further object of the present invention to provide a method and apparatus for assembling an optical fiber communication cable having a relatively long uninterrupted length.

It is a further object of the present invention to provide a method and apparatus for assembling an optical fiber communication cable in an inexpensive and less awkward operation.

It is a further object of the present invention to provide a method and apparatus for assembling an optical fiber communication cable with negligible risk to the optical fiber or fibers used in the cable.

These and other objects will become more apparent from the following description and drawings.

Embodiments of the method and apparatus for assembling the optical fiber communication cable and the cable produced by the instant invention are shown in the drawings wherein like numerals depict like parts.

FIGS. 3A-3H show various seam configurations for a tubular conductor formed in accordance with the instant invention.

FIG. 4 is a schematic representation in cross section of a cable produced according to the instant invention.

FIG. 5 is a schematic representation in partial cross section of a top view of an alternative embodiment of the apparatus used to assemble a second embodiment of the optical fiber communication cable core.

FIG. 6 is a schematic representation in cross section of the second embodiment of the optical fiber communication cable produced by the instant invention.

In accordance with this invention, a method and apparatus for assembling an optical fiber communication cable are provided. Furthermore, in accordance with this invention, the communication cable formed by the instant method and apparatus is also provided.

The instant method of assembly makes use of a known tube forming technique to permit assembly of a cable having a core comprising a metal or metal alloy tubular conductor having a relatively long uninterrupted length. The cable produced by the instant method and apparatus should satisfy all electrical, physical, and operational constraints for both underground and undersea uses.

Furthermore, the instant method and apparatus permit production of a relatively small diameter cable having a core exhibiting excellent strength and flexibility characteristics. The cable produced by the instant method and apparatus may have a diameter substantially about one-quarter that of a conventional cable and a transportation volume substantially about one-tenth that of a conventional cable.

The method of assembling the optical fiber communication cable of the instant invention is relatively inexpensive, simple to perform, and more efficient. The instant method readily solves the problem of forming, filling, and sealing a tubular conductor with negligible risk to the fiber or fibers within the conductor. It also produces a tubular conductor that is substantially free of internal and external rough spots, that is both substantially circular and concentric, and that is substantially clean on both the internal and external surfaces before, during, and after tube fabrication.

Figure 1:
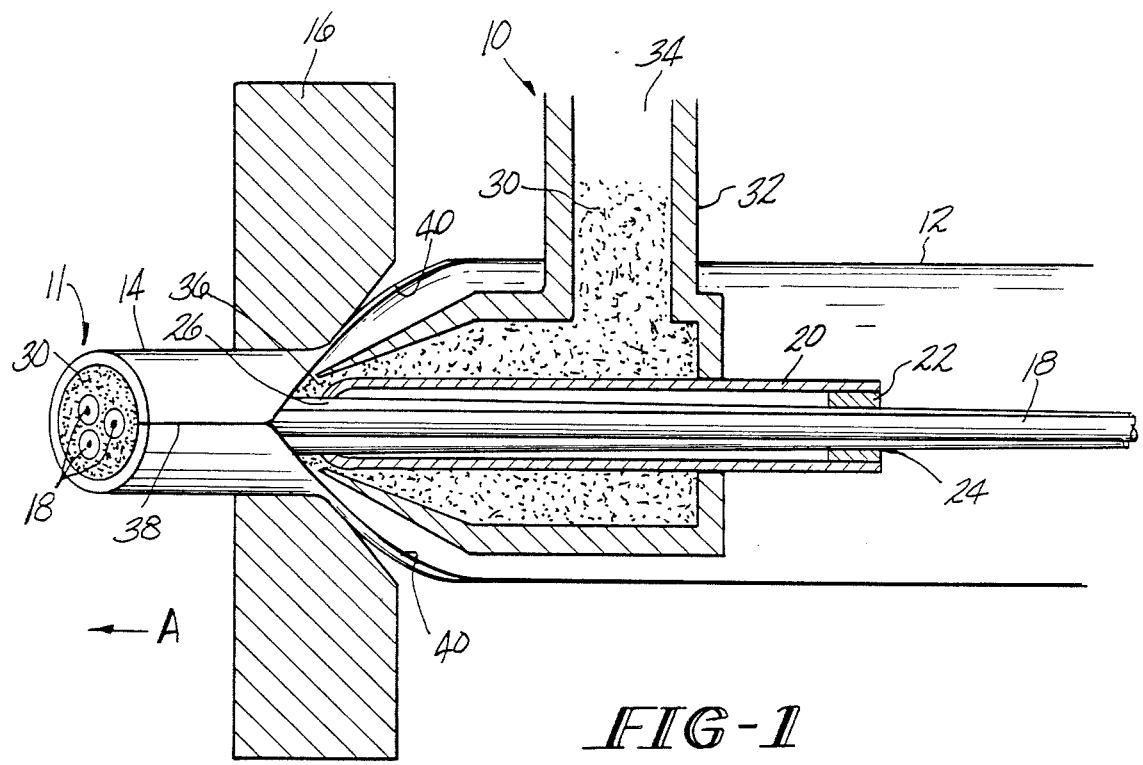
FIG. 1 is a schematic representation in partial cross section of a top view of an apparatus used to assemble the optical fiber communication cable core.
Figure 2:
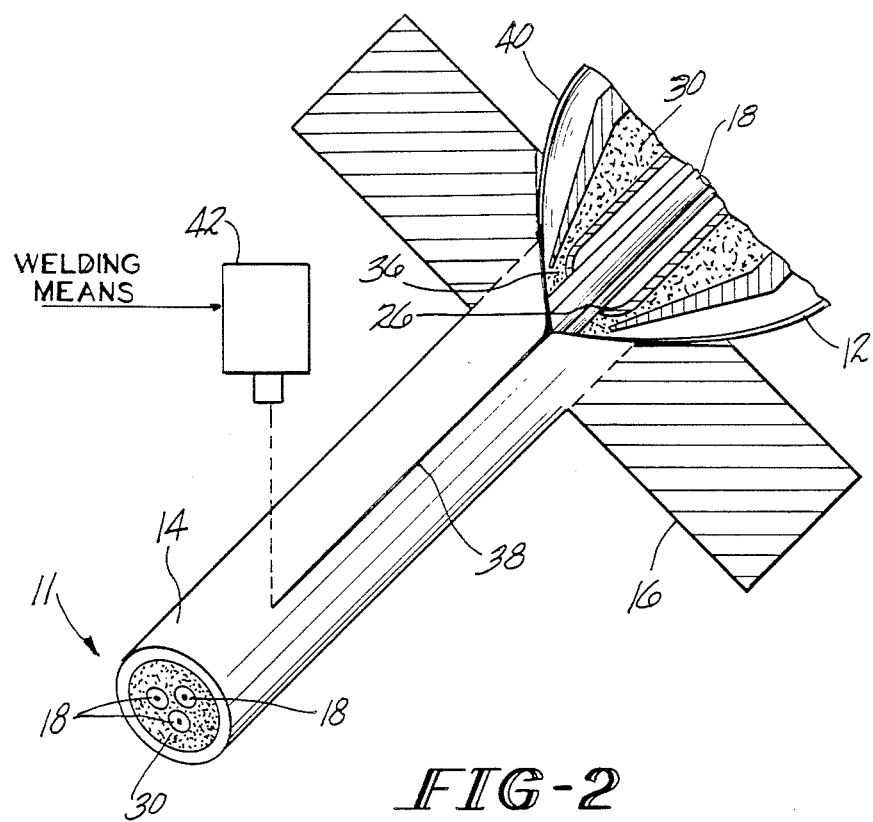
FIG. 2 is a schematic representation in partial cross section of a perspective view of the apparatus of FIG. 1 with a mechanism for sealing the tubular conductor comprising part of the core.

Referring now to FIG. 1, an apparatus 10 for assembling a cable core 11 is shown. The apparatus 10 is capable of taking a strip 12 of metal or metal alloy and forming it into a tubular conductor 14 by pulling the strip through a forming die 16. The use of a die to form a tube from strip material is well known in the art. *Manufacturing Processes*, Sixth Edition, by Myron L. Begeman et al., John Wiley and Sons, Inc., 1957, pp. 283-285, discloses various dies for forming a tube out of strip. Any suitable die arrangement may be utilized. Any suitable means not shown for pulling the strip may be used.

As the tubular conductor 14 is being formed by die 16, at least one optical fiber 18 is inserted into the forming conductor tube. Apparatus 10 has a chamber 20 through which optical fiber or fibers 18 pass. At one end of chamber 20 is pressure seal 22 having opening 24 through which the optical fiber or fibers 18 enter chamber 20. At the opposite end of chamber 20 is apertured nozzle 26. Chamber 20 and nozzle 26 guide the optical fiber or fibers 18 and deposit the fiber or fibers 18 at the throat 28 of forming die 16. Although any suitable technique may be used, in a preferred manner, the optical fiber or fibers 18 are caused to pass through chamber 20 and are inserted into tubular conductor 14 by pulling with any suitable means not shown on one end of the fiber or fibers 18. In this way, optical fiber or fibers 18 are inserted simultaneously with the forming of tubular conductor 14. Tubular conductor 14 may contain any desired number of optical fibers 18. In a preferred embodiment, it contains from one to six optical fibers.

In a preferred embodiment, each optical fiber 18 comprises a photo-conductor glass rod. However, any suitable optical fiber may be used in the cable.

Simultaneous with the tubular conductor being formed and the optical fiber or fibers 18 being inserted into the conductor, a cushioning material 30 is injected into tubular conductor 14 so that the material 30 substantially surrounds the optical fiber or fibers 18. Apparatus 10 has a concentric pressure chamber 32 for inserting cushioning material 30. The cushioning material 30 enters chamber 32 through entry 34, preferably while under pressure. The motion of strip 12 and fiber or fibers 18 in the direction of arrow A causes material 30 to flow through nozzle 36 at one end of chamber 32. The cushioning material 30 is preferably introduced into chamber 32 under pressure so that as cushioning material 30 enters the forming tubular conductor 14, it substantially completely fills the tube and positions fiber or fibers 18. Any suitable mechanism not shown can be used to supply chamber 32 with material 30 under pressure.

The use of cushioning material 30 is highly desirable in a cable which may be subjected to high bending or hydrostatic stresses. Cushioning material 30 has two primary functions. First, it lubricates the fiber or fibers 18 to prevent stiction and microbending. Second, it provides the fiber or fibers 18 with a hydrostatic, ambient pressure environment. In a preferred embodiment, cushioning material 30 comprises a nonsetting void filler such as a gel. However, any suitable non-setting void filler may be utilized.

Strip 12 which is used to form tubular conductor 14 preferably has an initial width greater than the outside circumference of the tube formed by forming die arrangement 16. The initial width is about 5% to about 15%, preferably about 10%, greater than the tube outside circumference. By starting with such an initial strip, the seam 38 created during tube forming will be put into significant compression, thereby remaining substantially closed even if spring back occurs.

Alternatively, in order to reduce the pulling or drawing force it has been found to be quite advantageous to form the tubular conductor 14 from a metal strip 12 having a transverse cross-sectional area which exceeds the desired transverse tube cross-sectional area by about 5% to about 20% and preferably by about 8% to about 17%. Inherently with the tubeforming techniques used herein the extra volume of metal provided by the excess cross-sectional area or strip width shows up essentially as longitudinal extension of the resulting tube 14. It has been found that using the tube-forming techniques described herein there is no significant change in wall thickness. The wall thickness of the resultant tube is substantially the same as the thickness of the starting strip 12. The tube-forming techniques described herein are, therefore, similar in some respects to "tube sinking". The total length of tube 14 produced by the tube-forming techniques of this invention will be greater than the total length of the starting strip 12 due to the aforenoted longitudinal extension of the tube 14. The amount of the tube extension corresponds substantially to the aforenoted percentage differentials in strip cross-sectional area versus tube cross-sectional area.

This extra volume of metal also inherently assists in the formation of a tube 14 having a relatively tight seam 38 without a notch or well at the outer periphery of the seam. Further, the edges defining the seam 38 are inherently deformed by the tube-forming techniques described above to provide substantially nonlinear and intermeshing edges as shown in FIG. 3A. This results in an increased surface area of the seam edges 44 and 46 to which the sealing material can adhere as compared to the original strip 12 edges thereby improving the resultant strength of the seal. This also results in better hermeticity than prior cable core assemblies.

The deformed intermeshing edges 44 and 46 are the inherent result of the processing in accordance with the above described techniques and do not correspond to the shape of the original strip edges. The deformed edges 44 and 46 result from the drawing or sinking of the tube by the process of this invention.

In contrast, a tube formed by folding even with the use of a die forming technique would not have such deformed edges since in a folding operation the starting strip would not include the excess material which the process of this invention converts into longitudinal extension by drawing or sinking. A deficiency of the folding technique is that a well or depression occurs at the outer surface along the seam. In accordance with this invention the presence of excess material from the metal strip causes the outer surface to form against the die so as to eliminate such a well or depression along the seam. This is highly significant since it reduces the amount of solder or brazing material which would be required to provide a circular outer periphery to the resultant tube 14.

In order to create a mechanical interlock joint, the edges 40 of strip 12 may be shaped in any suitable manner so that a mechanical seal is formed along seam 38 during tube forming. FIGS. 3A–3H show various types of seam configurations which could be obtained by shaping edges 40. FIG. 3A shows a butt type joint. FIG. 3B shows a scarf type joint. FIG. 3C shows a lap scarf type joint. FIG. 3D shows a lap key type joint. FIG. 3E shows a self-aligned lap wedge type joint. FIG. 3F shows a self-aligned double lap wedge type joint. FIG. 3G discloses a self-aligned key type joint. FIG. 3H discloses a mechanical rivet key type joint.

The material comprising strip 12 and tubular conductor 14 must possess certain conductivity, strength, and thickness to diameter ratio characteristics. The material must possess a high conductivity since tube 14 acts as a conductor in the final cable. Second, since conductor 14 is preferably the only metal component in the cable, the material must possess high strength properties. Preferably, the material possesses significant tensile strength and a relatively high yield strain. A material having a relatively high yield strain reduces the overall cable diameter. The yield strain of the material forming the tubular conductor also determines how much of the ultimate strength of an outer loadbearing layer can be used without permanently straining the tubular conductor and breaking the optical fiber or fibers.

The material used to produce tubular conductor 14 must sustain certain coiling forces during fabrication and installation. Therefore, a thickness to diameter ratio K which indicates good formability characteristics is required. If the material does not possess good formability characteristics, the tubular conductor wall may be crinkled or buckled during tube formation. If this occurs on the inner surface of the conductor, optical fiber or fibers 18 may suffer microbending against angular surfaces and large increases in attenuation may result.

The strip material preferably has a conductivity in the range of about 0.25 to 1.02 IACS, a yield strain in the range of about 0.0017 to 0.0095, preferably about 0.0050 to 0.0095, and a thickness to diameter ratio of about 0.02 to 0.05. A number of metals and alloys possess the required combination of strength, conductivity, and thickness to diameter ratio and may, therefore, be utilized. In a preferred embodiment, the material forming strip 12 and tubular conductor 14 comprises a copper/zirconium alloy, designated CDA 151, and manufactured by Olin Corporation. Copper alloy 151 has a conductivity of about 0.95 IACS, a yield strain of about 0.0034 and a thickness to diameter ratio of about 0.15.

Since the strip is being pulled through the forming die, a slightly harder material is required in order to avoid strip breakage during tube forming. The material selected should have a hardness at least about ¼ hard. The CDA 151 copper alloy of the preferred embodiment can be hardened to meet this requirement. In the preferred embodiment, the CDA 151 copper alloy has a hardness in the range of about at least ¼ hard to about full hard. In accordance with this invention the optical fiber 18 is preferably fed into the tube without substantial back tension. This may be accomplished through the use of a slack loop and dancer arrangement or any other desired technique wherein the fiber merely travels along with the tube 14 as the tube is formed. A result of the processes in accordance with this invention is that the length of the optical fiber 18 after fabrication exceeds the length of the tube by less than about 1%. The optical fiber 18 is, therefore, in slight compression rather than in tension which would deleteriously affect its transmission properties. Since the fiber 18 is fed into the tube during forming without substantial back tension removal of the drawing force for forming the tube 14 causes the tube material to elastically contract thereby providing the relative difference in length of the tube 14 versus the length of the optical fiber 18.

While the invention is particularly applicable to a range of metals and alloys it is preferably applied to high strength copper alloys. It has already been noted that it is desirable that the yield strain, which is the strain at the yield strength at 0.2% offset, should be less than about 0.0095 and, preferably, as close as possible to 0.0095. Copper alloys because they have a lower modulus of elasticity can achieve this yield strain limitation without the necessity of going to extremely high strengths as, for example, might be required with stainless steel. This results in a unique combination of properties for the resultant tube, namely it has very high strength but not so high as to prevent its being formed from a metal strip. Further, it has a high yield strain to prevent damage to the fiber in use.

Preferably, the alloy should have good resistance to softening upon short-term exposure to elevated temperatures so that it will not lose significant strength during the sealing operation. Suitable copper alloys in accordance with this invention having the requisite strength and softening resistance comprise alloys drawn from the following systems: copper-zirconium, copper-chromium, copper-iron, copper-silver, copper-magnesium-phosphorus, copper-nickel-silicon, etc. Generally, in such copper alloy systems copper is present in an amount of at least about 95% and represents the balance of the alloy. The alloying elements may be selected from the group consisting of zirconium, chromium, iron, magnesium, phosphorus, nickel, silicon, tin and silver as well as combinations thereof. For applications where a moderate strength level and a conductivity greater than about 50% IACS are needed, the alloying elements should preferably be present in an effective amount to provide the desired strength and softening resistance up to about 5% by weight of the alloy and most preferably in such an effective amount up to about 3% by weight of the alloy.

In addition to the previously described CDA Alloy 151 other suitable materials include CDA Alloys 155, 194 and 195. In addition, other high strength copper alloys such as CDA Alloys 638 and 654 can be used for very high strength applications. Alloy 638 includes aluminum, silicon and cobalt within the aforenoted range while Alloy 654 includes silicon, tin and chromium also within that range. In accordance with this invention the metal tube should preferably be formed from a material having a minimum of 45 ksi tensile strength at 400° F. in order to be properly processable in accordance with this invention which involves heating the tubing during soldering while it is maintained under high tension.

Further, for certain applications where conductivity is not of significant importance the yield strength of the tube should be at least about 100 ksi and most preferably at least about 150 ksi.

The tubular conductor 14 formed by the apparatus 10 should have some hermeticity. However, if the mechanical interlock joint does not provide sufficient hermeticity, a welding device 42 may be employed to close seam 38. In lieu of welding, a soldering device may be used. In either welding or soldering, the outer surface of seam 38 should be substantially smooth and circular and its inner surface should have minimal roughness. By providing minimal roughness on the inner surface, potential damage to the optical fiber or fibers 18 is reduced. It is also important that the chosed sealing technique not create heat sufficient to melt the cushioning material and thereby create a stop weld material. Any low temperature, high-energy welding or soldering technique may be used. Suitable techniques include laser beam and plasma arc welding and ultrasonic soldering.

The core 11 of cable 10 is fabricated by pulling strip 12 through forming die 16 to form tubular conductor 14. While the tubular conductor is being formed, optical fiber or fibers 18 are passed through chamber 20 having nozzle 26 and deposited at the throat of the forming die. In this manner, formation of tubular conductor 14 and insertion of optical fiber or fibers 18 occur simultaneously. At the same time, a cushioning material 30 enters pressure chamber 32, preferably under pressure. Movement of strip 12 and optical fiber or fibers 18 causes cushioning material 30 to flow into the forming tube and substantially fill tube 14 and substantially surround optical fiber or fibers 18.

By providing the strip with an initial width greater than the outside circumference of the tube formed by die 16, seam 38 created during tube forming will be placed under compression. Furthermore, by providing strip 12 with shaped edges 40, a mechanical seal can be created. If the hermeticity of the tubular conductor need be increased, seam 38 may be welded by welding device 42.

An alternative apparatus 50 for fabricating cable core 11 is shown in FIG. 4. In this embodiment, tubular conductor 14 is formed as before by passing strip 12 through forming die 16. Optical fiber or fibers 18 and cushioning material 30 are inserted as in the apparatus of FIG. 1 simultaneously with the tube forming. However, in lieu of any welding or soldering, a tube edge locking sheath 52 is co-extruded around tubular conductor 14 to maintain conductor 14 in a closed configuration. The locking sheath 52 provides the desired hermeticity and obviates the need for welding or soldering seam 38.

The mechanism 54 for co-extruding locking sheath 52 around tubular conductor 14 is well known in the art. Any suitable co-extrusion arrangement may be used for mechanism 54. *Manufacturing Processes*, Sixth Edition, by Begeman et al., John Wiley and Sons, Inc., 1957, pp. 281–283 discloses such a suitable arrangement for co-extruding a sheath around a tube.

The material forming locking sheath 52 may comprise an epoxy, KEVLAR, MYLAR, fiberglass, or any other suitable material. By co-extruding the locking sheath 52 around tube 14 and obviating welding or soldering, the risk of damage being done to the optical fiber or fibers 18 and the cushioning material 30 is substantially reduced.

Using apparatus 50, the method of forming tubular conductor 14 and inserting optical fiber or fibers 18 and cushioning material 30 into conductor 14 is as before. The final step in assembling cable core 11 is different in that instead of welding or soldering seam 38, the tube edge locking sheath 52 is co-extruded around tubular conductor 14 using mechanism 54.

After cable core 11 has been assembled utilizing apparatus 10 or 50, the cable core is surrounded by several additional layers. A dielectric layer 56 is extruded about the cable core by any suitable extruding arrangement not shown in a conventional manner. The dielectric layer 56 preferably comprises a high density polyethylene, although any suitable material may be used. The dielectric layer preferably takes no direct part in system telemetry and acts only as an insulator. However, if desired, it may be designed to take part in the system telemetry.

Surrounding the dielectric layer is a loadbearing layer 58. The loadbearing layer serves as the primary tensile element in the cable, although some fraction of the total load is carried by tubular conductor 14. This layer also acts as an abrasion-resistant layer which completely covers and protects cable core 11. Any suitable material may be used for layer 58. In a preferred embodiment, this layer comprises a contrahelix of KEVLAR filaments contained in a matrix of thermosetting epoxy. The fabrication of this layer may be done in a known manner by any suitable fabrication device not shown, i.e. fabricating an annulus utilizing a die arrangement.

Finally, an outer covering 60 is fabricated around the loadbearing layer 58. The outer covering 60 serves as a barrier to water intrusion and defocuses external cutting or abrading forces. The outer covering 60 comprises any suitable material such as an elastometric layer which is extruded over the loadbearing layer 58 in any conventional manner by any conventional extrusion mechanism not shown. In a preferred embodiment, covering 60 comprises a layer of black polyurethane. FIGS. 4 and 6 show two embodiments of a finally assembled cable 70.

The optical fiber communication cable generated by the instant invention theoretically can have a substantially infinite length. Cable lengths of about 25 km. between repeaters can be fabricated by the instant method and apparatus.

The optical fiber communication cable assembled by the instant invention may have any size diameter; however, the instant invention is particularly suited for assembling a cable having a relatively small diameter. The tubular conductor 14 may have any desired inside and outside diameters. For example, it may have an inside diameter in the range of about 0.17 cm to 0.25 cm and an outside diameter of about 0.24 cm to 0.35 cm. In a preferred embodiment, where the tubular conductor is made from copper alloy 151, the inside diameter of conductor 14 is about 0.1823 cm. and the outside diameter of conductor 14 is about 0.2604 cm. The overall diameter of the cable produced by the instant invention may be in the range of about 0.821 cm to about 0.977 cm. In the preferred embodiment having a tubular conductor of copper alloy 151, the overall cable diameter is about 0.9267 cm.

Strip 12 used to produce tubular conductor 14 may have any suitable configuration. For example, strip 12 could have a trapezoidal shape.

Assembling an optical fiber communication cable in accordance with the method of the instant invention has several advantages. First, both the optical fiber or fibers and the cushioning material can be inserted into the tubular conductor while the tubular conductor is being formed thereby reducing the likelihood of breaking, kinking, or damaging the optical fiber or fibers. Second, the tubular conductor can be formed with a mechanical interlock joint which provides some hermeticity. Third, the tubular conductor can be formed so that it has a relatively small diameter, thereby reducing the overall cable diameter. Fourth, the need for welding and soldering the tube seam may be obviated by co-extruding a tube edge locking sheath around the tubular conductor.

The cable produced by the instant invention can be used in both underground and undersea communication applications. For example, it could be used to supply data support and power to a deep sea sensor. It could also be used for underground and undersea telephone applications.

While the conductor tube has been described in a preferred embodiment as being formed from copper alloy 151, it may be formed from any metal or metal alloy exhibiting the required conductivity, strength, and formability characteristics.

The U.S. patent and publications set forth in this application are intended to be incorporated by reference herein.

It is apparent that there has been provided with this invention a novel method of assembling an optical fiber communication cable which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An optical fiber communication cable comprising:
   at least one optical fiber;
   a high strength drawn copper alloy tube surrounding said optical fiber, said tube having its interior free of any structural reinforcing member and a tube defining wall of a desired substantially constant thickness;
   said tube wall including a generally longitudinally extending seam; and
   said seam being defined by opposing substantially nonlinear deformed edges whose length from the outside of said tube to the inside of said tube exceeds the thickness of said wall.

2. A cable as in claim 1 wherein said tube at said seam has a smooth and generally circular outer surface.

3. A cable as in claim 2 wherein said seam is welded or soldered to provide hermeticity.

4. A cable as in claim 1 wherein said tube has a tube wall thickness to diameter ratio of about 0.02 to 0.50.

5. A cable as in claim 1 wherein said copper alloy tube further contains a cushioning material, said cushioning material substantially surrounding said at least one optical fiber.

6. A cable as in claim 1 further comprising said copper alloy tube being surrounded by at least one external layer.

7. A cable as in claim 6 wherein said at least one external layer comprises a dielectric layer.

8. The cable as in claim 1 further comprising said seam not extending substantially into the inside of said tube.

9. The cable as in claim 2 further comprising:

said tube being formed from a strip of material containing an excess volume of material; and said smooth and generally circular outer surface at said seam and said substantially non-linear deformed edges being formed as a result of said excess volume of material.

10. An optical fiber communication cable comprising:
at least one optical fiber;
a high strength drawn copper alloy tube surrounding said optical fiber;
said tube being formed from a copper alloy which is from about ½ hard to about full hard;
said tube having a tube defining wall of a desired substantially constant thickness;
said tube wall including a generally longitudinally extending seam; and
said seam being defined by opposing substantially nonlinear deformed edges whose length from the outside of said tube to the inside of said tube exceeds the thickness of said wall.

11. A cable as in claim 10 wherein said copper alloy is at least about full hard.

12. An optical fiber communication cable comprising:
at least one optical fiber;
a high strength drawn copper alloy tube surrounding said optical fiber;
said tube being formed from a copper alloy having a yield strain of from about 0.0017 to about 0.0095;
said tube having a tube defining wall of a desired substantially constant thickness;
said tube wall including a generally longitudinally extending seam; and
said seam being defined by opposing substantially nonlinear deformed edges whose length from the outside of said tube to the inside of said tube exceeds the thickness of said wall.

13. A cable as in claim 12 wherein said yield strain is at least about 0.0034.

* * * * *